Patented Apr. 10, 1934

1,954,729

UNITED STATES PATENT OFFICE 1,954,729

TREATMENT OF SUBSTITUTION DERIVATIVES OF CELLULOSE

Camille Dreyfus, New York, N. Y., and George Schneider, Montclair, N. J., assignors to Celanese Corporation of America, a corporation of Delaware No Drawing. Application August 26, 1929, Serial No. 388,618

17 Claims. (Cl. 260—102)

This invention relates to the treatment of derivatives of cellulose and relates more particularly to the treatment of organic derivatives of cellulose to increase their resistance to heat and to diminish their tendency to corrode metallic surfaces.

An object of our invention is to treat derivatives of cellulose, particularly organic derivatives of cellulose, with alcoholic amines, whereby their heat resistance is increased and their tendency to corrode metals is diminished. Other objects of our invention will appear from the following detailed description.

Organic derivatives of cellulose such as cellulose acetate, as ordinarily made, contain constituents, which cause solutions of the same to tend to corrode metallic surfaces such as nickel surfaces upon which solutions of the same are cast or extruded to make films. Moreover such derivatives of cellulose do not have as great a resistance to heat, as measured by the temperature at which they become discolored, as may be desired.

We have found that if derivatives of cellulose and particularly organic derivatives of cellulose are subjected to the action of an alcoholic amine, the constituents that tend to cause corrosion of metallic surfaces are either removed or converted into innocuous compounds, and moreover the heat resistance is increased.

In accordance with our invention we prepare derivatives of cellulose of greater heat test and of diminished corroding power by subjecting the same to the action of an alcoholic amine, preferably in aqueous solution.

While other derivatives of cellulose such as cellulose nitrate may be treated in accordance with our invention, we prefer to treat organic derivatives of cellulose such as organic esters of cellulose and cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

The derivatives of cellulose may be subjected to the solution of the alcoholic amine by adding the same either while in dry condition or while in wet conditions, preferably the latter, since better penetration into the cellulose acetate of the solution of the alcoholic amine is attained when the same is wet.

Any suitable alcoholic amine may be employed in our invention, examples of which are triethanol amine, $N(CH_2CH_2OH)_3$, trimethanol amine $N(CH_2OH)_3$, diethanol amine, $NH(CH_2CH_2OH)_2$ or dimethanol amine, $NH(CH_2OH)_2$. Generally we prefer to employ triethanol amine, which may or may not have diethanol amine or monomethanol amine, or both, admixed therewith.

The alcoholic amine is applied to the derivative of cellulose preferably in aqueous solution. The concentration of the amine and the relative amount of the same to the derivative of cellulose may be varied within wide limits. Thus if cellulose acetate is treated with triethanol amine, the triethanol amine may be applied in aqueous solutions of less than 0.1 to 5% or more concentration, and the amount employed may be from less than 1 part to 10 parts or more by weight of the triethanol amine per 100 parts of cellulose acetate.

The derivative of cellulose that is treated by our process forms plastics, yarns and the like that are resistant to high temperatures. Thus fabric made of yarn containing such derivative of cellulose may be safely ironed at a higher temperature than fabric made from the untreated derivative of cellulose.

An important application of this invention is in the treatment of cellulose acetate which is to be employed as a film base for photographic or cinematographic films. Solutions of cellulose acetate that have not been treated tend to corrode the metallic surface of wheels or moving bands upon which they are extruded in film making, particularly if such surface is made of nickel. However cellulose acetate, when treated in accordance with this invention, is not corrosive, and therefore when employed in making films, do not tend to corrode the metallic surfaces.

If further enhanced properties are to be imparted to the organic derivative of cellulose, the same may be subjected, either prior or subsequent to the treatment with the alcoholic amine, to the action of a hypochlorite to reduce the color and increase the transparency, as is more fully described in our application 386,733 filed August 17, 1929. If it is desired to remove such impurities or deleterious substances that cause photographic films made from the derivative of cellulose to develop desensitized or oversensitized spots, the ground derivative of cellulose after having been subjected to the process of this invention, may be passed through a sieve of suitable mesh, whereby the finer particles, which contain such impurities, are removed from the coarser particles that remain on the sieve. This process is more fully described in our application 382,275 filed July 30, 1929.

The derivative of cellulose treated in accordance with our invention may be associated with volatile solvents and plastifiers, such as triacetin, diethyl tartrate, dibutyl tartrate, diethyl phthalate, triphenyl phosphate, etc., by known processes, to form plastic sheets, blocks, tubes, rods or articles by any suitable process. Another important application of this invention is in the making of molding powder containing the purified derivatives of cellulose in finely divided condition in association with plastifiers but containing little or substantially no volatile solvents, which may be molded under heat and pressure to desired shape. As stated, films to be employed as a base for photographic films or for other purposes may also be made from this material. The purified derivative of cellulose may also be used for making lacquers, etc. In order further to illustrate our invention but without being limited thereto, the following specific examples are given.

Example I

Cellulose acetate is formed by the acetylation of cellulose with acetic anhydride in the presence of glacial acetic acid as a solvent and a suitable catalyst such as sulfuric acid. The solution formed after acetylation, either with or without treatments, such as ripening wherein the cellulose acetate is hydrolized to impart desired solubility characteristics, is then washed by the addition of a large amount of water. The precipitated cellulose acetate, after washing and/or any other desired treatment but without intermediate drying, is treated by subjecting the same to a solution of triethanol amine. The proportions may be as follows:

| | Parts by weight |
|---|---|
| Cellulose acetate | 100 |
| Water | 800 |
| Triethanol amine | 2.5 |

The time of treatment is 1 hour and the temperature is room temperature. The cellulose acetate is then separated from the solution of the triethanol amine and is washed free of the same. The so treated cellulose acetate has a greatly increased resistance to heat and also solutions of the same in inorganic solvents cause little if any corrosion of a nickel surface.

Example II

Cellulose acetate is prepared as in Example I and is treated with a solution of triethanol amine as described in said example.

Either prior to the treatment with the triethanol amine, or subsequently thereto, the cellulose acetate is treated with an aqueous solution of sodium hypochlorite, the proportions being as follows:

| | Parts by weight |
|---|---|
| Cellulose acetate | 200 |
| Water | 1600 |
| Sodium hypochlorite | 1 |

The time of treatment with the hypochlorite is 1 hour and the temperature is room temperature, after which the cellulose acetate is separated from the hypochlorite solution and is then washed free of the hypochlorite. This treatment with the hypochlorite removes a large proportion of those ingredients that tend to impart coloration to the cellulose acetate and which tend to reduce the transparency of plastics or films made therefrom.

The cellulose acetate after having been subjected to the treatment of the triethanol amine and the hypochlorite is dried and ground until substantially all passes through a screen having 5 meshes to the inch, and is then passed through a screen having 40 meshes per inch. Particles of cellulose acetate that are retained on the screen are substantially free from impurities that tend to cause over-sensitized or desensitized spots in photographic films. This purified cellulose acetate may be dissolved to form a solution or dope which may be extruded in any known manner to form photographic film base.

Having described our invention, what we claim and desire to secure by Letters Patent is:

1. The method of improving the properties of a compound selected from the group consisting of cellulose esters and ethers comprising subjecting the same to the action of an aliphatic alcoholic amine.

2. The method of improving the properties of a compound selected from the group consisting of organic acid esters of cellulose and cellulose ethers comprising subjecting the same to the action of an aliphatic alcoholic amine.

3. The method of improving the properties of cellulose acetate comprising subjecting the same to the action of an aliphatic alcoholic amine.

4. The method of improving the properties of a compound selected from the group consisting of organic acid esters of cellulose and cellulose ethers comprising subjecting the same to the action of an ethanol amine.

5. The method of improving the properties of cellulose acetate comprising subjecting the same to the action of an ethanol amine.

6. The method of improving the properties of cellulose acetate comprising subjecting the same to the action of triethanol amine.

7. The method of improving the properties of a compound selected from the group consisting of organic acid esters of cellulose and cellulose ethers comprising subjecting the same to the action of triethanol amine and also the action of an alkali-forming metal hypochlorite.

8. The method of improving the properties of cellulose acetate comprising subjecting the same to the action of triethanol amine and also to the action of an alkali-forming metal hypochlorite.

9. The method of improving the properties of a compound selected from the group consisting of organic acid esters of cellulose and cellulose ethers comprising subjecting the same to the action of triethanol amine and also to the action of an alkali-forming metal hypochlorite, grinding the same and separating the finer particles from the coarser particles.

10. The method of improving the properties of cellulose acetate comprising subjecting the same to the action of triethanol amine and also to the action of an alkali-forming metal hypochlorite, grinding the same and separating the finer particles from the coarser particles.

11. Method of improving the properties of a compound selected from the group consisting of organic acid esters of cellulose and cellulose ethers comprising subjecting the same to the action of triethanol amine, grinding the same and separating the finer particles from the coarser particles.

12. Method of improving the properties of cellulose acetate comprising subjecting the same to the action of triethanol amine, grinding the same and separating the finer particles from the coarser particles.

13. A compound selected from the group consisting of cellulose esters and ethers having high resistance to discoloration when subjected to dry heat, having been prepared by subjecting the same to the action of an aliphatic alcoholic amine.

14. Cellulose acetate having high resistance to discoloration when subjected to dry heat, having been prepared by subjecting the same to the action of an alphatic alcoholic amine.

15. A compound selected from the group consisting of organic acid esters of cellulose and cellulose ethers having high resistance to discoloration when subjected to dry heat, having been prepared by subjecting the same to the action of triethanol amine.

16. Cellulose acetate having high resistance to discoloration when subjected to dry heat, having been prepared by subjecting the same to the action of triethanol amine.

17. Cellulose acetate which is of high resistance to heat, has high clarity, and is relatively inert to photographic emulsions, having been treated with triethanol amine, an alkali-forming metal hypochlorite and freed of finer particles.

CAMILLE DREYFUS.
GEORGE SCHNEIDER.